United States Patent [19]

Messina, Jr. et al.

[11] Patent Number: 5,631,959

[45] Date of Patent: May 20, 1997

[54] METHOD AND APPARATUS FOR PROTECTING CIRCUITRY ACCESSIBLE THROUGH METALLIC CONTACTS FROM STATIC DISCHARGE DAMAGE

[75] Inventors: Sebastian J. Messina, Jr., Fredon; Joseph E. Murphy, Seaside Heights, both of N.J.

[73] Assignee: Lucent Technologies Inc., Murray Hill, N.J.

[21] Appl. No.: 432,557

[22] Filed: May 1, 1995

[51] Int. Cl.⁶ .................................................. H04M 1/00
[52] U.S. Cl. .................................................. 379/428; 379/436
[58] Field of Search .................................................. 379/428, 433, 379/429, 434, 435, 436, 61; 439/700, 188, 824, 289, 181, 187

[56] References Cited

U.S. PATENT DOCUMENTS

| | | | |
|---|---|---|---|
| 4,710,596 | 12/1987 | Kurokawa | 379/435 |
| 4,736,404 | 4/1988 | Anglikowski et al. | 379/62 |
| 5,052,484 | 10/1991 | Gesta | 439/188 |
| 5,067,151 | 11/1991 | Inagaki et al. | 379/433 |

*Primary Examiner*—Thomas W. Brown
*Assistant Examiner*—Jack Chiang
*Attorney, Agent, or Firm*—Samuel R. Williamson

[57] ABSTRACT

Electro-static discharge protection for sensitive circuitry in devices, which have exposed metallic contacts for accessing such circuitry, is achieved by providing switching apparatus in these devices. The switching apparatus isolates the sensitive circuitry from static electricity which may be impressed upon the exposed metallic contacts. In operation, when a first device is placed in engagement with a second device for transferring data, charging a battery or the like, the switching apparatus relies on the weight exerted by the first device on the second device for establishing a conducting path between the contacts and the sensitive circuitry in each device. This conducting path is interrupted when the first device is removed from the second device thereby providing isolation for the sensitive circuitry from any static electricity which may be impressed upon the exposed metallic contacts. The switching apparatus also is configurable for establishing a conducting path from the contacts on each device to ground potential whenever the first device is removed from the second device. The ground potential conducting path provides additional protection for the sensitive circuitry against electro-static discharge damage.

16 Claims, 7 Drawing Sheets

800

METHOD AND APPARATUS FOR PROTECTING CIRCUITRY ACCESSIBLE THROUGH METALLIC CONTACTS FROM STATIC DISCHARGE DAMAGE

BACKGROUND OF THE INVENTION

1. Technical Field

This invention relates to metallic contacts used in wireless transceivers such as cordless telephones and, more particularly, to metallic contacts which provide protection from Electro-Static Discharge (ESD) for circuitry accessible through the contacts.

2. Description of the Prior Art

Wireless transceivers such as cordless telephones have been available in the art for a number of years. These transceivers typically comprise a fixed or base unit and an associated portable or handset unit. Initialization for subsequent communications between the base unit and the handset unit is achieved by placing the handset unit in a mating cradle in the base unit at which time metallic contacts on the base unit and the handset unit are mated together. Through these contacts, the base unit typically transfers a digital security code and a frequency channel assignment upon which the base unit and handset unit establish initial communications. Also, charging current from the base unit is provided through these metallic contacts to the handset unit for charging a battery which is located in the handset unit and provides operating power for this unit. Such operation is described in U.S. Pat. No. 4,736,404 which issued to R. E. Anglikowski et al. on Apr. 5, 1988.

As described in U.S. Pat. No. 4,736,404, the digital security code and frequency channel information are obtained from a microprocessor in the base unit and coupled via the metallic contacts to a microprocessor in the handset unit over a direct-current charging path that is established between these two units. This direct-current charging path exists between the base unit and the handset unit whenever the handset unit is nested in the cradle of the base unit. As long as the handset unit remains in the cradle of the base unit and the handset unit battery needs charging, charging current for this battery is generated in the base unit and this current is passed through the metallic contacts on the base unit and the metallic contacts on the handset unit to the battery in the handset unit.

When the handset unit is removed from the cradle of the base unit, the metallic contacts on both the base unit and the handset unit are exposed and a person is able to touch the contacts on these units. If that person happens to be electrically charged with static electricity and touches the metallic contacts, unfortunately, the electrical potential then held by that person may be discharged directly into ESD-sensitive circuitry, such as the microprocessor and/or other circuitry, which is connected to the touched metallic contact. Such electrical potential, when received by the microprocessor and other circuitry, could possibly cause the affected unit to malfunction. It is therefore desirable to isolate the metallic contacts from the ESD-sensitive circuitry when the handset unit is removed and located remote from the base unit.

SUMMARY OF THE INVENTION

In accordance with the invention, the above ESD problem is solved by providing switching apparatus in both a base unit and handset unit of a wireless transceiver. This switching apparatus isolates sensitive circuitry from static electricity which may be impressed upon the exposed contacts whenever the handset unit is removed from engagement with the base unit.

In accordance with a first aspect of the invention, the switching apparatus relies on the weight exerted by the handset unit on the base unit for establishing a conducting path between each contact and the sensitive circuitry. This conducting path is established whenever the handset unit is placed in engagement with the base unit. This conducting path is interrupted, however, when the handset unit is removed from engagement with the base unit thereby providing isolation for this circuitry against ESD damage.

In accordance with a second aspect of the invention, the switching apparatus is configurable for establishing a conducting path from the contacts to ground potential whenever the handset unit is removed from engagement with the base unit. When this configuration is employed, additional protection is thereby afforded for the sensitive circuitry against ESD damage.

BRIEF DESCRIPTION OF THE DRAWING

This invention and its mode of operation will be more clearly understood from the following detailed description when read with the appended drawing in which.

Throughout the drawing, the same element when shown in more that one figure is designated by the same reference numeral.

DETAILED DESCRIPTION

Figure 1:
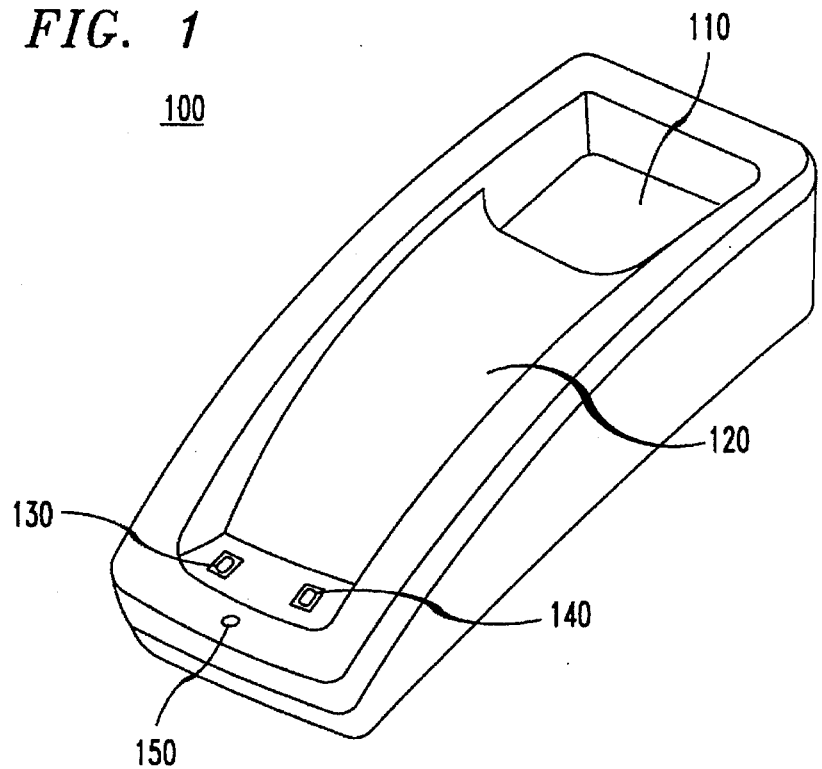
FIG. 1 is an illustration of a first embodiment of a base unit having a pair of metallic contacts for interfacing with a pair of mating contacts on a handset unit.

Referring now to FIG. 1, there is illustratively shown a fixed or base unit 100 for a wireless transceiver system with hollowed out sections 110 and 120 which form a cradle for nesting a mating portable or handset unit (not shown). Wireless transceiver systems with mating base units and handset units are presently available in the art. Examples of such units are the AT&T Corp. 4000 series cordless telephones and also the AT&T Corp. 5000 series cordless telephones. The base unit 100 also includes a pair of metallic contacts 130 and 140 and a light emitting diode 150. The pair of metallic contacts 130 and 140 interface with mating contacts on the handset unit, and the light emitting diode 150 provides an indication when the handset unit is present in the base unit and actively being charged by the base unit 100.

Figure 2:
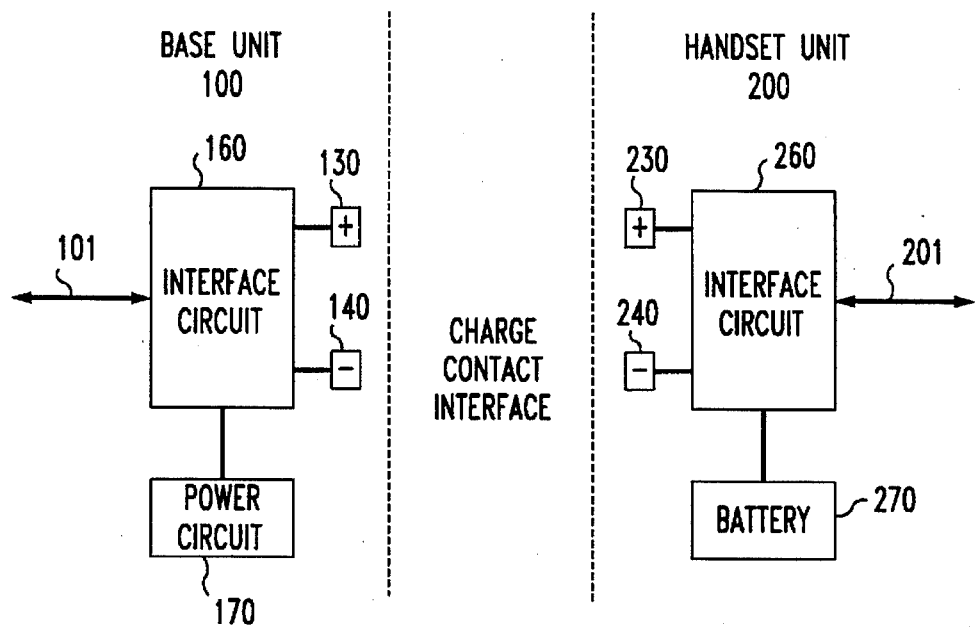
FIG. 2 shows a functional block diagram of some of the components of both a base unit and a handset unit in a wireless transceiver system.

Referring now to FIG. 2, there is illustratively shown a functional block diagram of some of the components of both the base unit 100 and a handset unit 200 in a wireless transceiver system. Included in the base unit 100 is an interface circuit 160 which receives over line 101 digital security code and frequency channel information from a microprocessor (not shown) in the base unit. This information is coupled to the metallic contacts 130 and 140 which, along with metallic contacts 230 and 240 on the handset unit, comprise a charge contact interface. Such interface is established when the handset unit is placed in the mating cradle of the base unit. Thus, when the handset unit is mated with the base unit, metallic contact 130 is physically in contact with metallic contact 230 and metallic contact 140 is physically in contact with metallic contact 240. Such operation is described in U.S. Pat. No. 4,736,404, incorporated herein by reference. Also included in the base unit 100 is a power circuit 170 used for charging a battery 270 in the handset unit 200 and a cradle status circuit (not shown) which determines when the handset unit 200 is nested in the base unit 100.

Contained in the handset unit 200 is an interface circuit 260 which is similar in function to the interface circuit 160 in the base unit 100. Through this circuit 160, the handset unit 200 receives the digital security code and frequency channel information from the charge contact interface and couples this information into a microprocessor and other circuitry (not shown) in the handset unit over line 201. The interface circuit 260 also receives charging current from the charge contact interface and couples this current to the battery 270.

When the handset unit is removed from the cradle of the base unit, the metallic contacts 130 and 140 on the base unit and metallic contacts 230 and 240 on the handset unit are exposed and a person is able to easily touch these contacts. Accumulation of electrostatic charges is problematic for static-sensitive devices, particularly semiconductor devices such as those employed in the handset unit and base unit of a wireless transceiver system. And humans can charge to potentials in excess of 20,000 volts through friction-induced static build-up or through interaction with electrical fields. Indeed, during the manufacture of sensitive semiconductor devices, a number of grounding systems have been invented for discharging static electricity. An example of such system is disclosed in copending U.S. patent application Ser. No. 08/311689, filed on Sep. 23, 1994. Also, a number of articles and books have been written on the subject. Two such examples are a book by William D. Greason entitled *Electrostatic Discharge in Electronics*, New York, John Wiley & Sons, Inc., 1992, and a book by Owen J. McAteer entitled *Electrostatic Discharge Control*, New York, McGraw-Hill, 1990. Nevertheless, electrostatic discharge continues to be a problem for static-sensitive devices.

In accordance with the disclosed embodiments of the invention, the harmful effects of electrostatic discharge are minimized in sensitive semiconductor devices and integrated circuits in a handset unit and a base unit by providing switching apparatus for the metallic contacts in these units which isolate the sensitive devices and circuitry from the metallic contacts when these contacts are exposed. Each switching apparatus embodiment, in accordance with a disclosed aspect of the invention, relies on the weight of the handset unit, when nested in the cradle of the base unit, to establish conducting paths from the contacts in both the handset unit and the base unit respectively to the sensitive devices and circuits in these units. Otherwise, when the handset unit is removed and located remote from the base unit, the metallic contacts are isolated from the devices and circuitry in the associated unit minimizing the possibility for ESD damage to these components.

Figure 3:
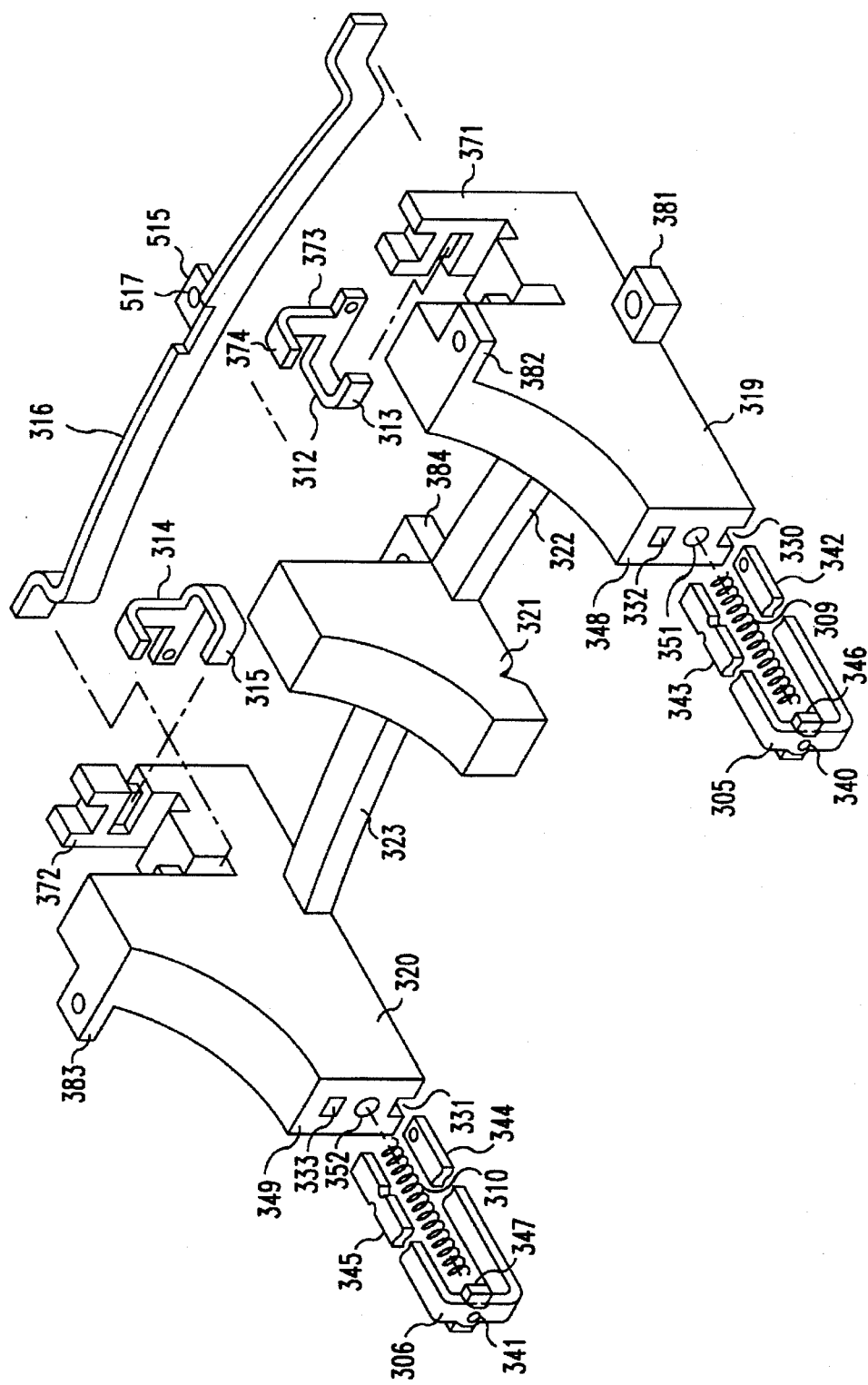
FIGS. 3 and 4 show a first embodiment of switching apparatus which provides a pair of wireless transceiver interface contacts, in accordance with the invention.
Figure 4:
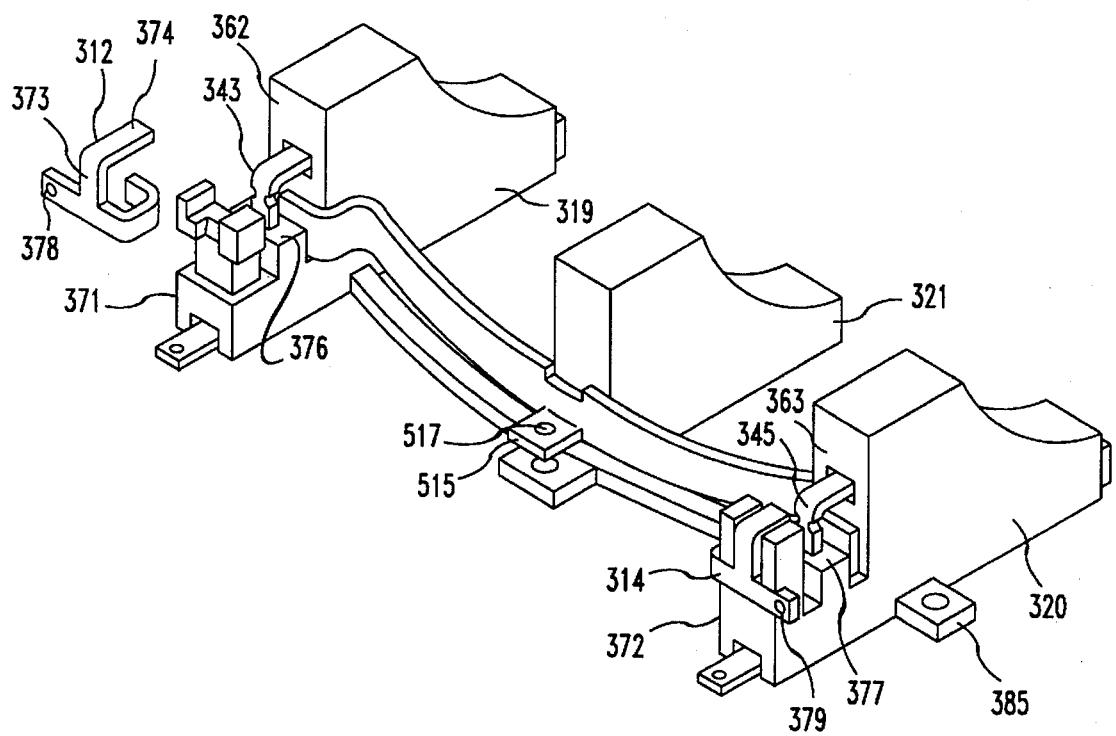

Referring now to FIGS. 3 and 4, in combination, them is illustratively shown a preferred embodiment of a switch 300 which provides a pair of wireless transceiver interface contacts and advantageously avoids the potential for ESD damage occurring to circuitry contained in either a base unit or an associated handset unit via these interface contacts.

The switch 300 comprises upstanding support members 319, 320, and 321, these members being connected by a radial bridge, comprising members 322 and 323, with upstanding support member 321 being equally centered between upstanding support members 319 and 320 via the radial bridge. The switch may be constructed from an insulated material such as, for example, acetylene butadiene styrene (ABS).

The support member 319 houses an interface contact 305, an activating coil spring 309 and a circuitry connecting element 312. The support member 320 houses an interface contact 306, an activating coil spring 310 and a circuitry connecting element 314. Both the circuitry connecting element 312 and the circuitry connecting 314 connect to circuitry in the associated unit.

In the upstanding support member 319 is a channel 330 and a slot 332 used for guiding the interface contact 305 which extends horizontally along the length of the vertical upstanding member 319. Also included in the upstanding support member 319 is a cylindrical opening 351 for the spring 309. Similarly, in the upstanding support member 320 is a channel 331 and a slot 333 used for guiding the interface contact 306 which extends horizontally along the length of the vertical upstanding member 320. Included in the upstanding support member 320 is a cylindrical opening 352 for the spring 310. Extending perpendicular to the upstanding support members 319, 320 and 321 are five heat-staking tabs 381 through 385 for mounting the switch 300 in the housing of a wireless transceiver.

The interface contact 305 has a dome-shaped protrusion 340 extending forward out of the unit and is used to make electrical contact with a mating metallic contact (not shown) on an accommodating transceiver unit. Extending leg portions 342 and 343 of the interface contact 305 are inserted into and guided by slot 332 and channel 330. The interface contact 306 also has a dome-shaped protrusion 341 extending forward out of the unit which is used to make electrical contact with a mating metallic contact (not shown) on an accommodating unit. And extending leg portions 344 and 345 of the interface contact 306 are inserted into and guided respectively by slot 333 and channel 331.

Spring 309 is inserted in the cylindrical opening 351 and butts against the rear face 346 of interface contact 305 in the vicinity of the dome-shaped protrusion 340 biasing this contact in a manner such that it extends outward from the vertical surface 348 on upstanding member 319. Similarly, spring 310 is inserted in the cylindrical opening 352 and butts against the rear face 347 of interface contact 306 in the vicinity of the dome-shaped protrusion 341 biasing this contact in a manner such that it extends outward from the vertical surface 349 on upstanding member 320.

After interface contact 305 is fully inserted into slot 332 and channel 330, extending leg portion 343 of the interface contact protrudes past vertical surface 362 on the rear of the upstanding support member 3 19. The extending leg portion is then bent downward and parallel to the vertical surface 362 for securing interface contact 305 within the upstanding support member 319. Similarly, after interface contact 306 is fully inserted into slot 333 and channel 331, extending leg portion 345 of the interface contact protrudes past vertical surface 363 of the upstanding support member 320. The extending leg portion 345 is then bent downward and parallel to the vertical surface 363 for securing interface contact 306 within the upstanding support member 320. The interaction of the parts of this portion of the switch may be clearer with reference being made to FIG. 4.

Located on the rear of and part of the upstanding support member 319 is a vertically extending support member 371 used to support the circuitry connecting element 312. A similar vertically extending support member 372 located on the rear and part of the upstanding support member 320 is used to support circuitry conducting element 314. Support members 371 and 372 respectively capture and support circuitry connecting elements 312 and 314 with a snap fit. Circuitry connecting element 312 is a generally u-shaped conductor with a right-angle projection 373 extending in an upward fashion to an additional right-angle projection 374. On the circuitry connecting element 312 is an opening 378 used for making a signal connection within the associated unit. And circuitry connecting element 314 is a mirror image of circuitry connecting element 312 and has an opening 379 used for making a signal connection within the associated unit.

Figure 5:
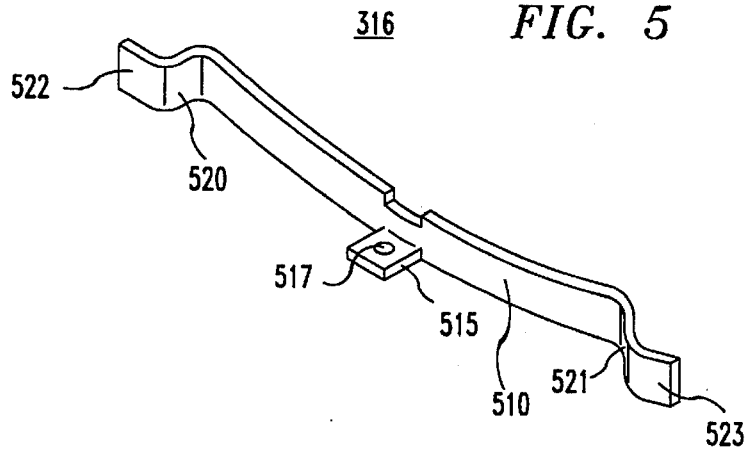
FIG. 5 shows a component of the switching apparatus shown in FIG. 4, in accordance with the invention.

The ESD ground contact 316, also depicted in FIG. 5, is positioned in a groove on shoulder 376 of the upstanding vertical member 319 and a groove on shoulder 377 of the upstanding vertical member 320. The ground contact 316 comprises a vertical portion 510 extending laterally in equal lengths from a center portion which comprises a tab 515 projected at a right angle from vertical portion 510. Within tab 515 is an opening 517 used for making a ground connection within the associated unit. Located at the ends of vertical portion 510 and projected at right angles from this portion are surfaces 520 and 521, and respectively projected at right angles from surface 520 and 521 are surfaces 522 and 523 in a plane parallel to surface 510.

In operation, when interface contacts 305 and 306 are extended, in response to a handset unit not being in the cradle of a base unit, the extended leg portion 343 of the interface contact 305 butts against surface 522 of the ESD ground contact 316. Similarly, the extended leg portion 345 of the interface contact 306 butts against surface 523 of the ESD ground contact 316. And a ground lead is connected to the opening 517 in tab 515 for dissipating any electrostatic charges that appear on the interface contacts 305 and 306.

When interface contacts 305 and 306 are depressed, in response to a handset unit being cradled in a base unit, the extended leg portion 343 of the interface contact 305 moves to and butts against surface 313 of the circuitry connecting element 312. Similarly, the extended leg portion 345 of the interface contact 306 moves to and butts against surface 315 of the circuitry conducting element 314. Thus, when the interface contacts 305 and 306 are depressed, the signals appearing on these contacts are respectively coupled to the circuitry connecting elements 312 and 314. The openings, 378 on circuitry connecting element 312 and 379 on circuitry connecting element 314, are used for making signal connections to circuitry, such as, for example, either the interface circuit 160 in the base unit or the interface circuit 260 in the handset unit, both of these units being described earlier herein with reference to FIG. 2. Through this operation, a pressure sensitive switch is achieved.

In a variation of the embodiment described in FIGS. 3 and 4, in combination, the ESD ground contact 316 may be removed from the assembly and the operation of this switch would be such that when interface contacts 305 and 306 are exposed, they are not grounded but, rather, isolated from the internal circuitry in the associated unit. In such an arrangement, the potential for ESD damage occurring to circuitry contained in either a base unit or an associated handset unit via these interface contacts is also minimized.

Figure 6:
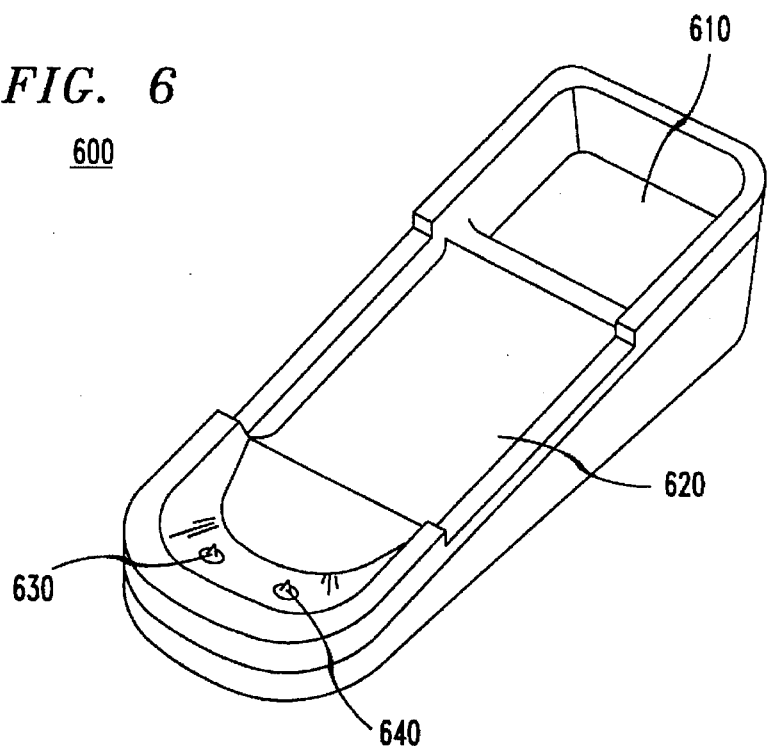
FIG. 6 is an illustration of a second embodiment of a base unit having a pair of metallic contacts for interfacing with a pair of mating contacts on a handset unit.

Referring next to FIG. 6, there is illustratively shown a fixed or base unit 600 for a wireless transceiver system with hollowed out sections 610 and 620 which form a cradle for nesting a mating portable or handset unit (not shown). The base unit 600 also includes a pair of metallic contacts 630 and 640 for interfacing with mating contacts on the handset unit.

Figure 7:
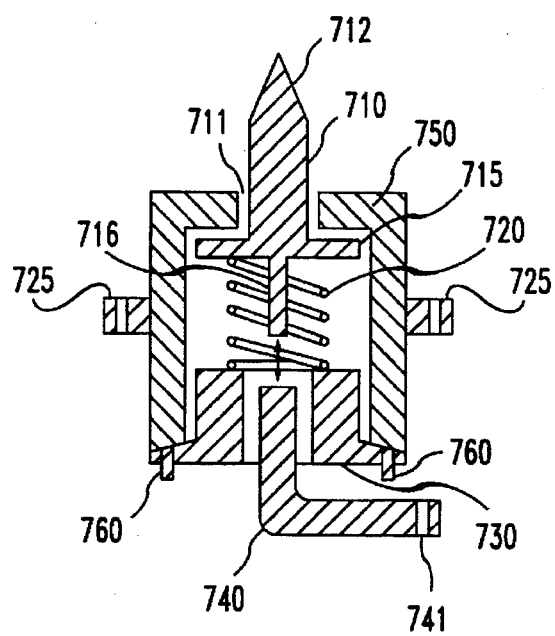
FIG. 7 shows a second embodiment of switching apparatus usable in providing a pair of wireless transceiver interface contacts, in accordance with the invention.

Referring next to FIG. 7, there is illustratively shown an embodiment of a switch 700 which includes metallic contacts and avoids the potential for ESD damage occurring to circuitry contained in either a base unit or an associated handset unit of a wireless transceiver via these metallic contacts. Two such switches may be mounted in the housing of base unit 600 shown in FIG. 6 for achieving the metallic contact function provided by contacts 630 and 640. ESD protection is achieved in this switch by providing a switching-make operation which disconnects the metallic contacts from the microprocessor and other circuitry in the unit when the handset unit is removed and located remote from the base unit.

Switch 700 includes a metallic cylindrical contact member 710 which extends upward through a narrow opening 711 in a non-conducting cylindrical support housing 750. The cylindrical contact member 710 includes a conical projection 712 at one end which comprises a contact element. At the other end of this contact member 710 is a cylindrical ring 7 15 which butts against the underside of a contact surface of the cylindrical housing as the contact member 710 extends through the opening 711. A smaller diameter cylindrical shaft 716 is connected to the cylindrical ring 715 and extends downward away from this ring.

Switch 700 also includes a coiled spring member 720, which along with the contact member 710, the ring 715 and the cylindrical shaft, are encapsulated in the support housing 750. This housing 750 serves as a travel guide for contact member 710 and the cylindrical shaft 716 connected thereto.

The switch 700 resides in two states, an open state and an active state. While in the open state, such as when the handset unit is removed and located remote from the base unit, any ESD signals impressed on the contact member 710 are isolated by this switch and thereby prevented from reaching ESD-sensitive circuitry in the transceiver. The switch is thus in the open state when the contact member 710 is fully extended upward through the opening 711 in the housing 750. When the switch 700 is in the active state, however, such as when the handset unit is in the base unit cradle, a signal on the contact member 710 is allowed to reach the circuitry in the transceiver. The switch 700 is in this active state when the contact member 710 is depressed into the housing 750 and the shaft 716 butts against a rear interface conductive member 740.

By way of illustrative operation, when the contact member 710 is depressed, the cylindrical shaft 716 travels downward until it comes in contact with the rear interface conductive member 740, and the switch 700 moves from an open to an active state. Conductive member 740 provides an electrical conducting path to circuitry in the associated unit via a wire (not shown) which may be inserted in an opening 741 and soldered to member 740. The interaction of these components provide a pressure sensitive switching action.

Other components included in the switch 700 are two support tabs 725 used to support the attaching of switch 700 to an associated unit. These tabs extend perpendicular to the center line of cylindrical housing 750 and flush with the outer surface of this housing. A non-conducting housing cover 730 is provided for capturing and retaining the spring 720 and other components in the housing. Heat staking posts 760 are connected to one end of the support housing 750 for securing the housing cover 730. In securing the housing cover, these heat staking posts 760 are inserted into openings on the housing cover 730 thereby securing this assembly.

Figure 8:
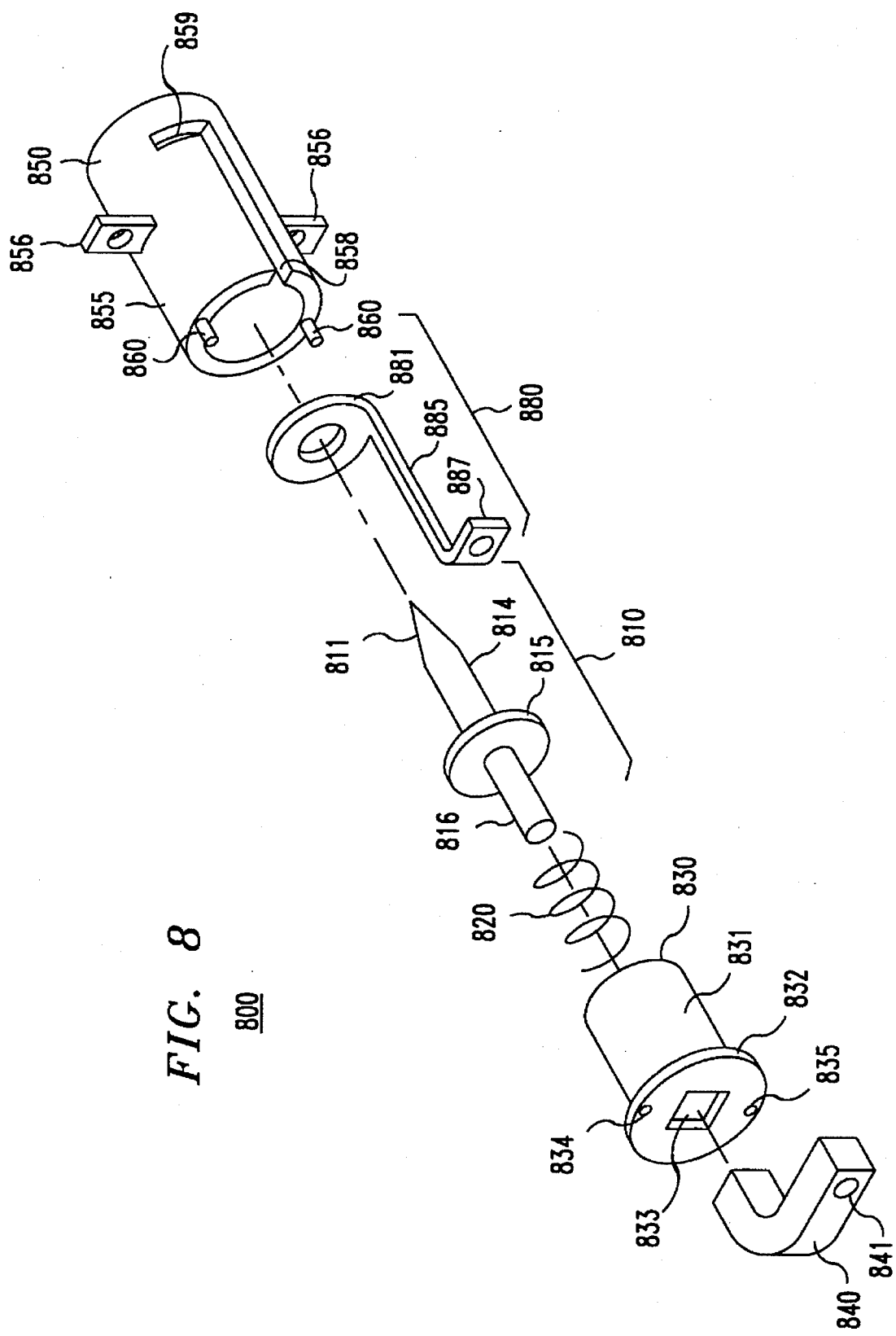
FIGS. 8 and 9 show a third embodiment of switching apparatus usable in providing a pair of wireless transceiver interface contacts, in accordance with the invention.
Figure 9:
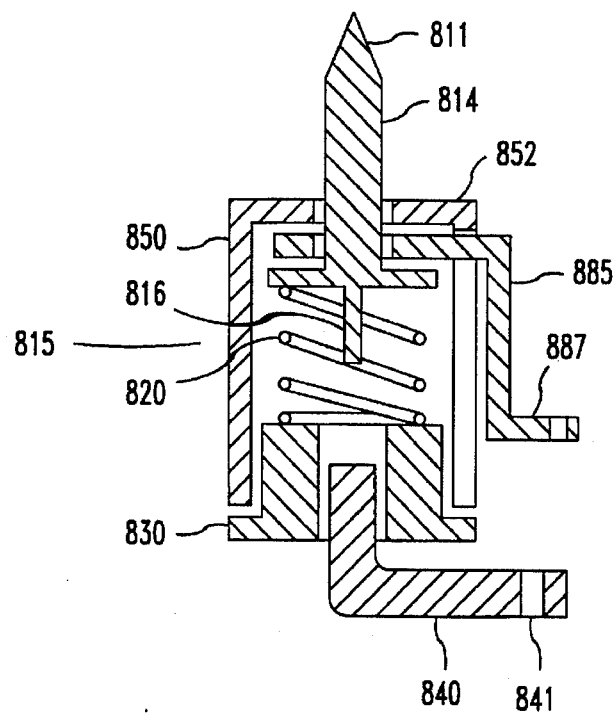

Referring now to FIGS. 8 and 9, there is illustratively shown an embodiment of a switch 800 which, although similar to the embodiment of the switch 700, also provides a switching break-before-make operation. That is, this switch provides a grounding path for any signals which might be impressed upon its contacts while these contacts are exposed. And when the handset unit is cradled in the base unit, this switch 800 also provides a path to the circuitry in the associated unit. Two such switches may be mounted in the housing of base unit 600 shown in FIG. 6 for achieving the metallic contact function provided by contacts 630 and 640.

With reference first to FIG. 8, there is shown an exploded view of the switch 800 including a non-conducting support housing 850, a make-contact member 880, a metallic contact member 810, a coil spring 820, a non-conducting housing cover 830, and a rear interface contact 840.

Support housing 850 consists of a shelled cylindrical portion with a circular shoulder 852 used to capture contact member 810. Extending perpendicular to the center line of cylindrical portion 850 and flush with the outer surface 855 of the cylindrical portion are two tabs 856 used to attach switch 800 to an associated unit. A slot 858 projects through the surface of the cylindrical portion and at a right angle to this slot 858, an additional slot 859 also projects through the cylindrical portion and used to capture make-contact member 880 when inserted into the support housing 850. Heat staking posts 860 are connected to one end of the support housing 850 for securing the housing cover 830.

The metallic contact member 810 includes a conical projection 811 to which a cylindrical portion 814, a cylindrical ring 815, and a cylindrical shaft 816 are all axially aligned with the point of the conical projection 811. Make-contact member 880 includes a doughnut-shaped portion 881 having an extended flange 885 attached thereto. Attached to the extended flange 885 is a rectangular tab 887 projecting at a right angle therefrom and used for connecting switch 800 to ground potential.

A coil spring member 820, while in compressive assembly, forces cylindrical ring 815 of member 810 in contact with member 881 within the housing. The housing cover 830 consists of a cylindrical portion 831 and a circular flat plate 832. The circular flat plate 832 includes a rectangular opening 833 which is axially aligned with the cylindrical shaft 816. The circular flat plate also includes openings 834 and 835 to accommodate the heat staking posts 860 located on the support housing 850. Assembled to housing cover 830 and within the rectangular opening 833 is rear interface contact 840 which consists of an L-shaped conductive member in which an opening 841 is provided for connecting switch 800 to circuitry in the associated unit.

As shown in an assembled configuration in FIG. 9, these components are encapsulated in the support housing 850, which allows travel for contact member 810 and the cylindrical shaft 816 connected thereto.

Thus, in operation, when the handset unit is removed from the base unit, the cylindrical ring 815 is positioned in engagement with the doughnut-shaped portion 881 such that the make-switch action is provided, i.e, the contacts are grounded. When the handset unit is cradled in the base unit, the contact member 810 is depressed and the cylindrical shaft 816 travels downward through the housing cover 830 where it contacts the rear interface contact 840 and provides the electrical conducting path to circuitry in the associated unit.

Figure 10:
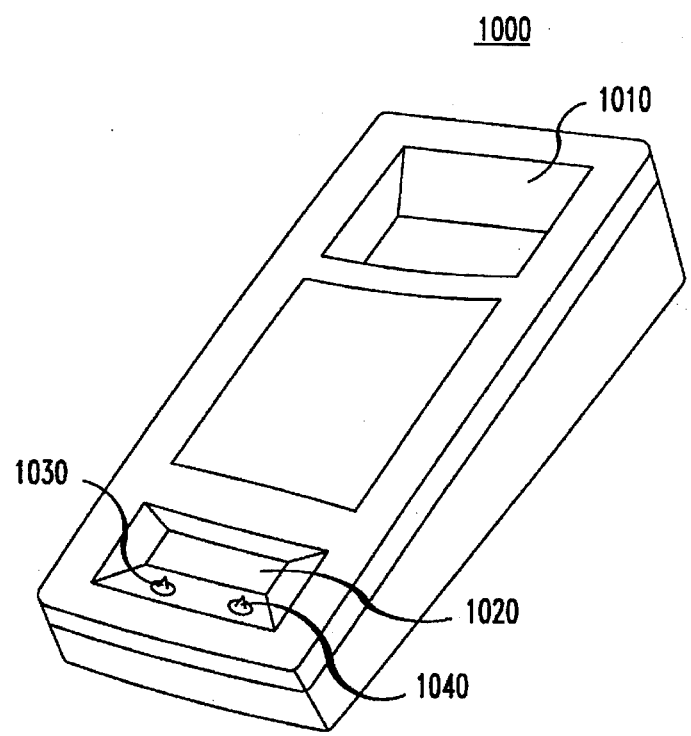
FIG. 10 is an illustration of a third embodiment of a base unit having a pair of metallic contacts for interfacing with a pair of mating contacts on a handset unit.

In FIG. 10, there is illustratively shown a fixed or base unit 1000 for a wireless transceiver system with hollowed out sections 1010 and 1020 which form a cradle for nesting a mating portable or handset unit (not shown). The base unit 1000 also includes a pair of metallic contacts 1030 and 1040 for interfacing with mating contacts on the handset unit.

Figure 11:
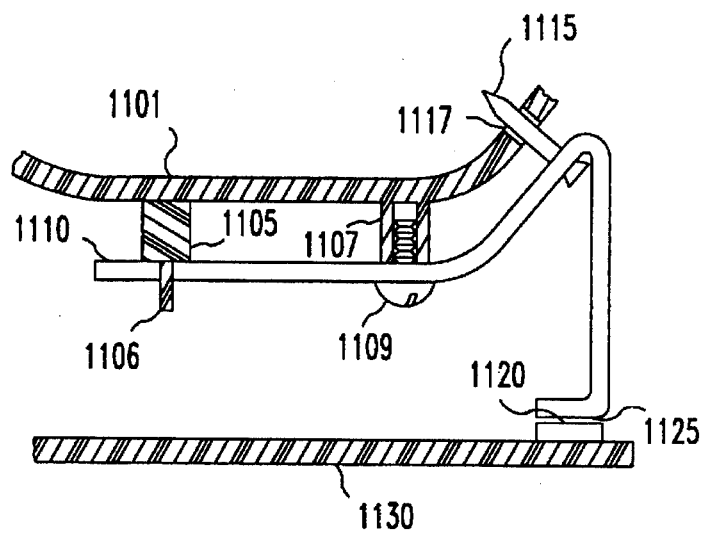
FIG. 11 shows a forth embodiment of switching apparatus usable in providing a pair of wireless transceiver interface contacts, in accordance with the invention.

Referring now to FIG. 11, there is illustratively shown a switching assembly 1100 which may be embodied in either a handset unit or base unit configured for operation in a wireless transceiver system. The switching assembly 1100 includes a metallic contact member 1110 embodied in a cut-away section of a unit housing including a top section 1101. The metallic contact 1110 is mounted to the housing via a screw 1109 inserted in a mounting boss 1107 and further held in position by a housing support post 1105 having a staking tab 1106. The metallic contact also includes a contact probe member 1115 which extends in a sweeping projection through an opening 1117 in the housing 1101. Two switching assemblies may be mounted in the housing of base unit 1000, shown in FIG. 10, for achieving the metallic contact function provided by contacts 1030 and 1040.

The contact probe member 1115 is secured to the metallic contact member 1110 by being forced through and retained in a form-fitting opening on the metallic contact member 1110. A contact interfacing area 1125 of the metallic contact member 1110 is positioned in close proximity to a circuit board contact 1120 which is mounted on a printed wiring board (PWB) 1130.

In operation, when the contact probe 1115 is depressed in response to a handset unit being cradled in a base unit, the metallic contact member 1110 is deflected in such a manner that the contact interfacing area 1125 of the metallic contact member 1110 is caused to come in contact with circuit board contact 1120, completing the electrical path from contact probe 1115 to the PWB 1130. The PWB 1130 is typically populated with the circuitry required for operation of the wireless unit. When the contact probe 1115 is not depressed, however, any ESD voltages appearing on the contact member 1110 will not be conducted to the circuitry on the PWB 1130.

Figure 12:
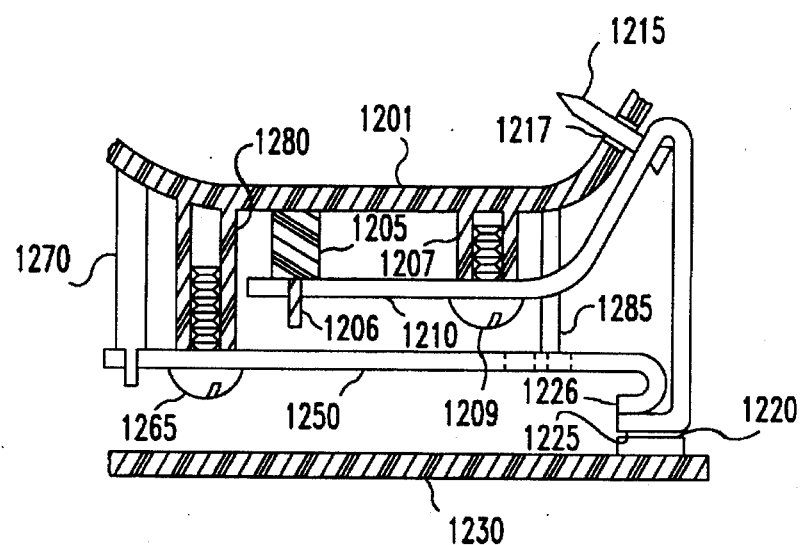
FIG. 12 shows a fifth embodiment of switching apparatus usable in providing a pair of wireless transceiver interface contacts, in accordance with the invention.

Referring now to FIG. 12, there is illustratively shown a switching assembly 1200 which may be embodied in either a handset unit or base unit configured for operation in a wireless transceiver system. Although this assembly is similar to the embodiment of the switch assembly 1100 in providing a break switching operation, it also provides a break-before-make switching operation.

The metallic contact member 1210 is embodied in a cut-away section 1201 of a housing and comprises a conductive member having a sweeping projection and is mounted to the housing section 1201 via a screw 1209. The conductive member is retained by the screw which is inserted in a mounting boss 1207 and the conductive member is further held in position by a housing support post 1205 with a staking tab 1206. Affixed to the metallic contact 1210 is a contact probe 1215 which projects through an opening 1217 in the housing 1201 and is forced through and retained in a form-fitting opening on the metallic contact member 1210. An end portion 1225 of the metallic contact member 1210 is positioned in close proximity to a circuit board contact 1220 which is mounted on a printed wiring board (PWB) 1230.

In operation, when the contact probe 1215 is depressed, in response to a handset unit being cradled in a base unit, the metallic contact member 1210 is deflected in such a manner that the end portion 1225 of the metallic contact member 1210 is caused to come in contact with circuit board contact 1220, completing the electrical path from contact probe 1215 to the PWB 1230.

Figure 13:
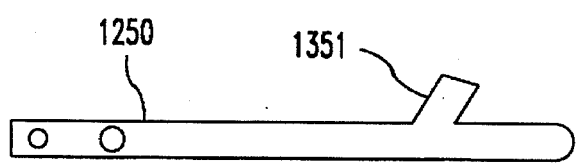
FIG.13 shows a grounding strap.

The break-before-make switching operation is achieved in metallic contact member 1210 via a grounding strap 1250, shown also in FIG. 13, for additional clarity, which contacts a contact interfacing area 1226 on the contact member 1210 while the handset unit is removed from the cradle of the base unit. This advantageously avoids harmful voltages from being introduced via the contact probe 1215 and coupled to the printed wiring board 1230 through the circuit board contact 1220. The grounding strap 1250 is mounted to the housing 1201 and secured via a screw 1265 which is mounted to a screw mounting boss 1280, this boss being a molded part of the housing 1201. The grounding strap 1250 is further secured to the housing by housing ground strap support member 1270. Upward travel of the grounding strap 1250 is controlled by the mechanical stop 1285 which contacts a finger 1251 on the grounding strap 1250.

While the foregoing invention has been described in terms of the above detailed embodiments, it will be readily apparent to those skilled in the art that various modifications can be made. Accordingly, such modifications are contemplated as being within the knowledge of one skilled in the art and may be utilized without departing from the spirit and scope of the claimed invention.

The invention claimed is:

1. A switching apparatus for isolating circuitry in a device from static electricity, the apparatus comprising:
    a first conducting element having a first contact member for making contact with a second contact member, said first contact member being located in a wireless handset unit and said second contact member being located in a wireless base unit matable with said wireless handset unit;
    a second conducting element connected to said circuitry; and
    means for connecting said second conducting element to said first conducting element when said first contact member is in contact with said second contact member and for disconnecting said second conducting element from said first conducting element when said first contact member is not in contact with said second contact member, said second conducting element being connected to said first conducting element when said wireless handset unit is mated with said wireless base unit by placing said wireless handset unit in a cradle portion of said wireless base unit and being disconnected from said first conducting element when said wireless handset unit is removed from the cradle portion of said wireless base unit.

2. The switching apparatus as in claim 1 wherein said connecting means includes a pressure sensitive switch.

3. The switching apparatus as in claim 2 wherein said pressure sensitive switch is actuated for connecting said second conducting element to said first conducting element by placing said first device in said cradle portion of said second device.

4. The switching apparatus as in claim 2 further including a third conducting element connected to ground potential.

5. The switching apparatus as in claim 4 wherein said pressure sensitive switch is actuated for connecting said first conducting element to said third conducting element when said wireless handset unit is removed from said cradle portion of said wireless base unit.

6. A switching apparatus for isolating circuitry in a device from static electricity, the apparatus comprising:
    a first conducting element having a first contact member for making contact with a second contact member, said first contact member being located in a wireless handset unit and said second contact member being located in a wireless base unit matable with said wireless handset unit;
    a second conducting element connected to said circuitry;
    a third conducting element connected to ground potential; and
    means for connecting said first conducting element to said second conducting element when said first contact member is in contact with said second contact member and for connecting said first conducting element to said third conducting element when said first contact member is not in contact with said second contact member, said first conducting element being connected to said second conducting element when said wireless handset unit is mated with said wireless base unit by placing said wireless handset unit in a cradle portion of said wireless base unit and being connected to said third conducting element when said wireless handset unit is removed from the cradle portion of said wireless base unit.

7. A method of isolating circuitry in a device from static electricity, the method comprising the steps of:
    providing a first conducting element having a first contact member for making contact with a second contact member, said first contact member being located in a wireless handset unit and said second contact member being located in a wireless base unit matable with said wireless handset unit;
    providing a second conducting element connected to said circuitry;
    connecting said second conducting element to said first conducting element when said first contact member is in contact with said second contact member, said second conducting element being connected to said first conducting element when said wireless handset unit is mated with said wireless base unit by placing said wireless handset unit in a cradle portion of said wireless base unit; and
    disconnecting said second conducting element from said first conducting element when said first contact member is not in contact with said second contact member, said second conducting element being disconnected from said first conducting element when said wireless handset unit is removed from the cradle portion of said wireless base unit.

8. The method of claim 7 wherein at least one of said units includes a pressure sensitive switch.

9. The method of claim 8 further including the step of actuating said pressure sensitive switch, said pressure sensitive switch actuating step connecting said second conducting element to said first conducting element responsive to said wireless handset unit being mated with said wireless base unit.

10. The method of claim 9 wherein at least one of said units includes a third conducting element connected to ground potential.

11. The method of claim 10 further including the step of actuating said pressure sensitive switch for connecting said first conducting element to said third conducting element when said wireless handset unit is removed from said cradle portion of said wireless base unit.

12. A switching apparatus for isolating circuitry in a device from static electricity, the apparatus comprising:

a first pair of conducting elements, a first one of said elements having a first contact member and a second one of said elements having a second contact member, said first and second contact members being arranged for making contact respectively with a third and a fourth pair of contact members, each one of said first pair of conducting elements being a first generally u-shaped member with extended leg sections for respectively inserting in a pair of first and second openings in an upstanding portion of a housing member;

a second pair of conducting elements connected to said circuitry;

means for connecting said second pair of conducting elements to said first pair of conducting elements when said first and second contact members are in contact respectively with said third and fourth contact members; and means for disconnecting said second pair of conducting elements from said first pair of conducting elements when said first and second contact members are not in contact with said third and fourth contact members.

13. The switching apparatus as in claim 12 wherein each one of said second pair of conducting elements is a second generally u-shaped member with a right angle projected member for securing said second generally u-shaped member to said upstanding portion of said housing member.

14. The switching apparatus as in claim 12 wherein each of said first and second contact members on said first pair of conducting elements is a dome shaped protrusion on said first generally u-shaped member at the common juncture of said extending leg sections, said dome shaped protrusion extending in a direction opposite said extending leg sections.

15. The switching apparatus as in claim 13 further including a single conducting element connected to ground potential, said connecting means connecting said first pair of conducting elements to said single conducting element when said first and second contact members are not in contact with said third and fourth contact members.

16. The switching apparatus as in claim 15 wherein said single conducting element is a rectangular elongated bar secured at each end by a pair of grooves in said upstanding portion of said housing member.

* * * * *